June 16, 1964     D. J. NASH     3,137,335
LADIES' PURSE AND REMOVABLE MIRROR
Filed Jan. 4, 1962
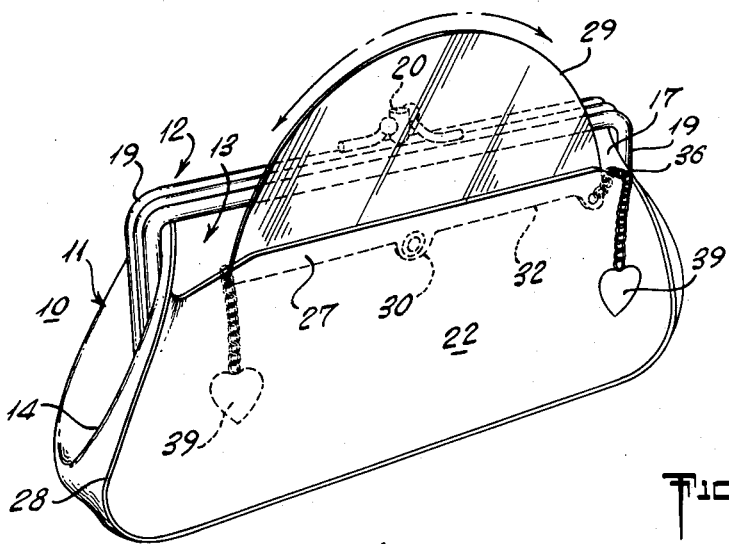
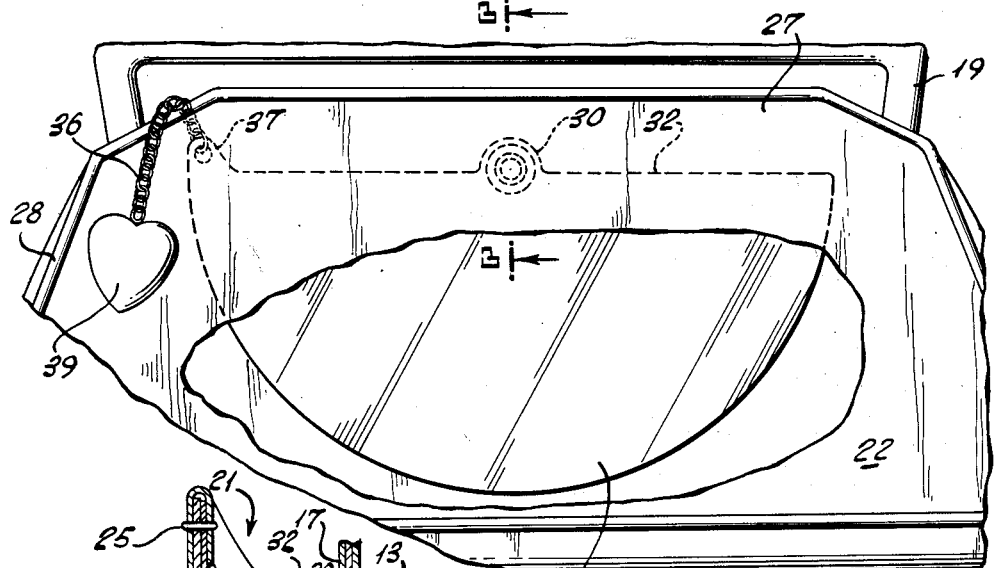
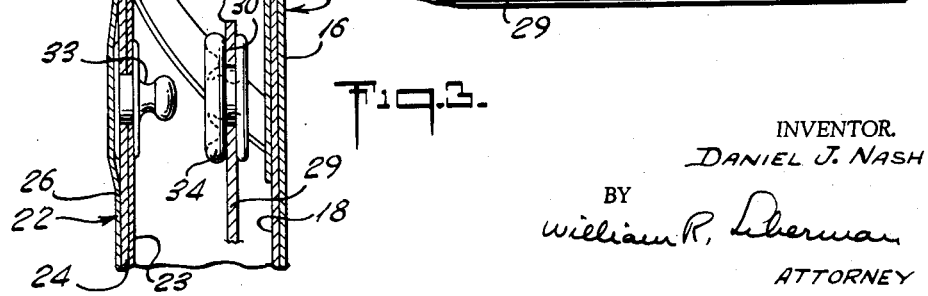
INVENTOR.
DANIEL J. NASH
BY
William R. Liberman
ATTORNEY

United States Patent Office 3,137,335
Patented June 16, 1964

3,137,335
LADIES' PURSE AND REMOVABLE MIRROR
Daniel J. Nash, Jersey City, N.J., assignor to Nash Inc., Jersey City, N.J., a corporation of New Jersey
Filed Jan. 4, 1962, Ser. No. 164,356
5 Claims. (Cl. 150—35)

The present invention relates generally to improvements in receptacles such as handbags, pocketbooks, wallets and the like, and it relates in particular to an improvement in ladies' handbags provided with a mirror as an accessory thereto.

The most common object found in a ladies' handbag or pocketbook is a mirror of one type or another. The mirror is located in the handbag usually unattached thereto and readily removable or is fastened to the interior of the handbag by a band, chain or other elongated flexible member. These conventional arrangements possess many drawbacks and disadvantages. Where the accessory mirror is of the unattached type it is frequently lost or forgotten and although a special compartment may be provided for it inside the handbag it usually is not properly replaced and when desired must be recovered from among other paraphernalia generally found in the handbag. The conventional handbag mirror is usually of a limited size, somewhat inconvenient to use, since it must be housed in the handbag and would otherwise excessively interfere with the use of the handbag as such. The drawbacks of the loosely carried handbag mirror, except for its possible loss or misplacement, are not remedied by attaching the mirror to the handbag in the usual fashion. Furthermore in both cases where the mirror is loose or attached, unless the handbag can be laid down aside from the mirror, the use of the mirror requires two hands, one for the mirror and one for the handbag. It is thus apparent that the conventional ladies' handbag provided with a mirror as an accessory leaves much to be desired.

It is thus a principal object of the present invention to provide an improved receptacle such as a handbag, pocketbook, wallet or the like.

Another object of the present invention is to provide an improved handbag or pocketbook for ladies having a mirror as an accessory thereto.

Still another object of the present invention is to provide an improved handbag for ladies having a mirror which is readily accessible without access to the interior of the handbag proper.

A further object of the present invention is to provide an improved handbag for ladies provided with a mirror of suitable size which may be easily and rapidly manipulated as desired to an operative or housed condition without opening the handbag proper, and which may be conveniently employed without the necessity of laying down the handbag.

Still a further object of the present invention is to provide a handbag of the above nature characterized by its ruggedness, simplicity, ease of operation and low cost.

The above and other objects of the present invention will become apparent from a reading of the following description taken in conjunction with the accompanying drawing wherein:

FIGURE 1 is a front perspective view of a handbag constructed according to and embodying the present invention, the mirror being illustrated in its extended position;

FIGURE 2 is a fragmentary front elevational view thereof, the mirror being illustrated in its retracted position;

FIGURE 3 is enlarged detailed fragmentary sectional view taken along line 3—3 in FIGURE 2, the mirror being illustrated in its detached housed position.

In a sense, the present invention contemplates the provision of a handbag of the character described comprising a receptacle-defining body member having formed therein a first opening affording access into said receptacle, a pocket carried by said body member having a second opening on the exterior of said handbag affording access into said pocket, and a mirror member located in said pocket and pivotally supported therein to be swingable about an axis perpendicular to said mirror between a retracted position nesting in said pocket and an extended position projecting through said second opening above said pocket.

According to a preferred form of the present invention, the handbag body member is provided with the conventional hinged frame member which is secured in the usual manner to the border of the body member surrounding the opening therein to and is manipulatable to an open position or a locked closed position. A pocket front wall is secured along its bottom and side edges to the front face of the body member and defines therewith the open topped mirror pocket. The mirror is of semi-circular configuration, having an apertured hub section located along the mirror diametric edge at the center of curvature of its arcuate peripheral edge. Secured to the upper inner border of the pocket front wall intermediate its side edges is a male snap fastener element which releasably engages a mating female element which registers with and is secured to the mirror hub section. A flexible pull member is attached to a corner of the mirror and extends outside the pocket.

Referring now to the drawing which illustrates a preferred embodiment of the present invention, reference numeral 10 generally designates the improved handbag which comprises a main body member 11 and a handbag frame 12 of conventional construction. The body member 11 includes a front wall 13, a rear wall, a bottom wall, and gusset type side walls 14 joining the front, rear and bottom walls of the body. The walls of body member 11 are of multi-ply construction, including an inner layer or liner 16 an outer or facing layer 17 and the front wall 13 includes, in addition, an intermediate layer or interliner 18. The various plies of the body member walls may be of various materials as desired. For example, facing layer 17 may be formed of leather, fabric, plastic or the like as may the other layers, in any well known fashion.

Handbag frame 12 is of the usual construction, and comprises a pair of U-shaped channel members 19 hinged to each other at the free ends of opposite legs thereof. The upper edges of the body member front rear and side walls are secured to corresponding frame members 19 by being clamped between the legs of the respective channels. Thus, access into the handbag proper is afforded through the open frame member which may be selectively closed and releasably locked by the associated latch assembly 20.

An open topped mirror pocket 21 is located on the front face of the handbag body member 11 and is delineated by the body member front wall 13 and a pocket front wall 22 substantially coextensive therewith. The pocket front wall 22 extends along the full width of the body member front wall 13 and along the sides thereof to a point short of the top. Like the body member walls, pocket front wall 22 is of multi-ply construction, including an inner layer or lining 23, an interliner 24 and a facing layer 26 which plies may be formed of the same material as the corresponding plies of body member 11. The upper border of the pocket wall facing layer 26 is folded over the top edge of the pocket wall 22 and stitched thereto, as indicated at 25 to finish the upper border of the pocket wall 22. The side top edges of the pocket wall 22 are downwardly outwardly inclined to the wall side edges to provide the pocket wall 22 with a transversely extending narrow flap 27. It should be noted that the facing ply 17 on the body member front wall 13 extends from the top thereof to a point a short distance below the top border of the pocket wall 22. The contiguous edges of the body member walls and the pocket wall are joined by stitching and engage a finishing binder 28 in the usual fashion.

Removably housed in pocket 21 is a mirror member 29 preferably formed of a flat polished metal plate. Mirror member 29 is of semicircular configuration and is provided with an apertured hub section 30 along diametric edge 32 of mirror member 29 midway between the ends thereof and concentric with the center of curvature of the arcuate peripheral edge of the mirror. The radius of mirror 29 is a little less than the height of pocket 21.

A snap fastener male element 33 is attached in the conventional manner to the upper border of the pocket wall 22 midway between the sides thereof, said element 33 projecting into pocket 21 and the base thereof being sandwiched between wall plies 24 and 26. A snap fastener female element 34, mating with male element 33 registers with the aperture in the mirror hub 30 and is secured thereto in usual manner. In the normal assembled condition, fastener elements 33 and 34 are interengaged and the mirror member 29 is swingable about the longitudinal axis of the snap fastener between a retracted position nesting in the pocket 21 as illustrated in FIGURES 2 and 3 of the drawing and an extended operative position projecting above the pocket 21 as illustrated in FIGURE 1.

In order to facilitate swinging of mirror member 29 between its retracted and extended positions there is provided a pull member in the form of a thin light chain 36 having one end thereof fastened to an apertured ear 37 projecting from a corner of and formed integral with the mirror member 29. Chain 36 extends outside pocket 21 and carries on its free end a finger piece in the form of an ornament 39.

Considering now the normal operation of the handbag described above, when mirror member 39 is in its retracted, pocked-housed condition, pull chain 36 and ornament 39 depend from the upper corner of the pocket wall 22 along the outer face thereof. By pulling chain 36 upwardly and around hub 30, mirror member 29 may be swung 180° clockwise to its extended position outside pocket 21, in which position it may be employed as desired. Mirror 29 may be retracted by swinging it 180° counterclockwise into the pocket 21 by manipulation of pull chain 36. If desired, mirror 29 may be bodily separated from the handbag by disengaging snap fastener elements 32 and 33 and removing the mirror member 29. It may be returned to its pivotally attached position merely by aligning reengaging the fastener elements 33 and 34.

While there has been described and illustrated a preferred embodiment of the present invention, it is apparent that numerous alterations, omissions and additions may be made without departing from the spirit thereof.

Having now described my invention, what I claim and desire to secure by Letters Patent is:

1. A handbag of the character described comprising a receptacle-defining body member having formed therein a first opening affording access into said receptacle, a pocket carried by said body member and having a second opening on the exterior of said handbag affording access into said pocket, and a semi-circular mirror member located in said pocket and pivotally supported therein about a mid-point along the upper diametric part of said mirror member and said pocket, to be swingable about an axis perpendicular to said mirror between a retracted position nesting in said pocket and an extended position projecting through said second opening above said pocket.

2. The handbag of claim 1, wherein said mirror is separably attached to a wall of said pocket.

3. The handbag of claim 1, including a snap fastener having one section thereof affixed to a wall of said pocket and the other mating section thereof affixed to said mirror, said snap fastener defining said pivotal support.

4. A handbag comprising walls defining an open topped handbag body member including a front wall, a frame including a pair of hinged members movable between opened and closed positions and affixed to the upper edges of said body member to selectively open and close said bag, a pocket wall affixed along its side and bottom edges to said body member front wall to define therewith an open topped pocket, a first snap fastener element secured to the upper inner face of a wall of said pocket intermediate the sides thereof, a flat semicircular mirror located in said pocket, and a second snap fastener element matingly engaging said first snap fastener element and affixed to said mirror substantially midway along the diametric edge thereof.

5. The handbag of claim 4, including a flexible pull member attached to a corner of said mirror and extending outside said pocket.

References Cited in the file of this patent
UNITED STATES PATENTS

| | | |
|---|---|---|
| 1,583,120 | Brenner | May 4, 1926 |
| 1,674,153 | Appel | June 19, 1928 |
| 1,732,866 | Stiriss | Oct. 22, 1929 |
| 2,111,079 | Spear et al. | Mar. 15, 1938 |